US012110174B1

(12) United States Patent
Faiton et al.

(10) Patent No.: US 12,110,174 B1
(45) Date of Patent: Oct. 8, 2024

(54) TRASH CONTAINER HAVING AUTOMATED REPLACEMENT BAG DISPENSING SYSTEM

(71) Applicants: Shlomo Faiton, Cooper City, FL (US); Neal Rosenblum, Wilton Manors, FL (US)

(72) Inventors: Shlomo Faiton, Cooper City, FL (US); Neal Rosenblum, Wilton Manors, FL (US)

( * ) Notice: Subject to any disclaimer, the term of this patent is extended or adjusted under 35 U.S.C. 154(b) by 105 days.

(21) Appl. No.: 18/076,064

(22) Filed: Dec. 6, 2022

Related U.S. Application Data

(63) Continuation-in-part of application No. 17/356,851, filed on Jun. 24, 2021, now Pat. No. 11,518,609.

(60) Provisional application No. 63/046,084, filed on Jun. 30, 2020.

(51) Int. Cl.
*B65F 1/06* (2006.01)

(52) U.S. Cl.
CPC .............. *B65F 1/062* (2013.01); *B65F 1/067* (2013.01); *B65F 2210/126* (2013.01); *B65F 2210/165* (2013.01); *B65F 2210/179* (2013.01); *B65F 2210/1815* (2013.01)

(58) Field of Classification Search
CPC ........ B65F 1/062; B65F 1/067; B65F 1/1415; B65F 2210/126; B65F 2210/165; B65F 2210/179; B65F 2210/1815; B65F 2210/188
USPC .... 220/495.07, 908, 495.01, 495.04, 495.06, 220/908.1
See application file for complete search history.

(56) References Cited

U.S. PATENT DOCUMENTS

| | | | | |
|---|---|---|---|---|
| 3,451,453 | A | 6/1969 | Heck | |
| 4,349,123 | A | 9/1982 | Yang | |
| 4,592,192 | A * | 6/1986 | Jacob | B30B 9/3046 53/298 |
| 4,955,505 | A | 9/1990 | Battaglia | |
| 5,183,157 | A | 2/1993 | Darden | |
| 5,503,292 | A | 4/1996 | Cuccharia | |
| 5,505,334 | A | 4/1996 | Triglia | |
| 5,738,239 | A | 4/1998 | Triglia | |
| 5,794,809 | A | 8/1998 | Shuval | |
| 5,881,900 | A | 3/1999 | Meshorer | |
| 6,199,714 | B1 * | 3/2001 | Thompson | B65F 1/068 220/495.07 |
| 7,168,591 | B1 | 1/2007 | Miller | |
| 8,807,379 | B1 | 8/2014 | Hammond | |
| 9,701,469 | B1 | 7/2017 | Reith | |
| 2004/0206760 | A1 * | 10/2004 | Gagnebin | B65F 1/08 220/495.04 |
| 2006/0175336 | A1 * | 8/2006 | Wang | B65F 1/163 220/495.04 |
| 2013/0067857 | A1 * | 3/2013 | McDaid | B65F 1/1436 53/469 |

(Continued)

*Primary Examiner* — Elizabeth J Volz
(74) *Attorney, Agent, or Firm* — Mark D. Bowen, Esq.; Malin Haley DiMaggio & Bowen, P.A.

(57) ABSTRACT

A trash container having an automated trash bag dispensing system which automatically deploys a replacement trash bag upon removal of a filled bag. A supply of trash bags is fed into the main trash container by a motorized roller assembly. A pair of opposing suction pads are pivotally deployed inward and suction activation attracts the opposing sides of the bag to corresponding suction pads. Retraction of the suction pads functions to expand the bag to an open configuration whereby it is suitably configured to receive trash.

4 Claims, 20 Drawing Sheets

(56) References Cited

U.S. PATENT DOCUMENTS

| | | | | |
|---|---|---|---|---|
| 2016/0001297 | A1* | 1/2016 | Qiu | B65F 1/0033<br>241/24.1 |
| 2016/0083183 | A1* | 3/2016 | Tatom | B65F 1/065<br>220/495.04 |
| 2019/0382196 | A1* | 12/2019 | Li | B65F 1/065 |
| 2020/0047995 | A1* | 2/2020 | Chen | B65F 1/163 |
| 2020/0339344 | A1* | 10/2020 | Wang | B65F 1/1426 |

* cited by examiner

FIG. 14A
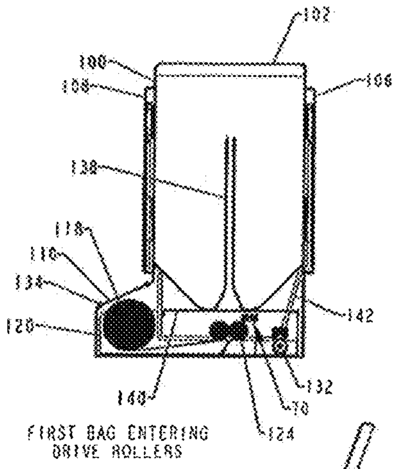
FIG 14B
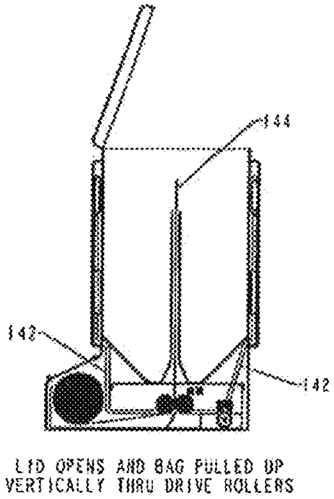
FIG. 14C
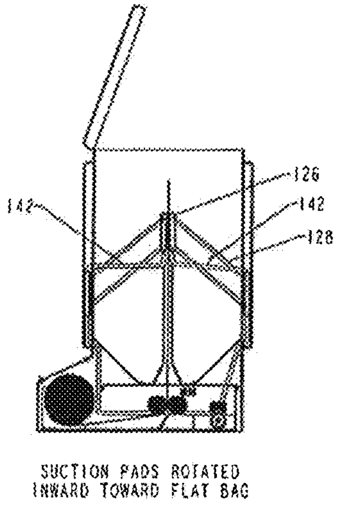
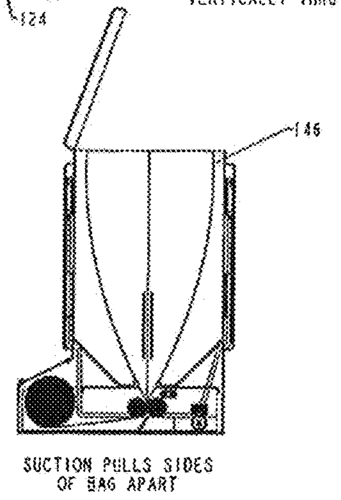
FIG. 14D
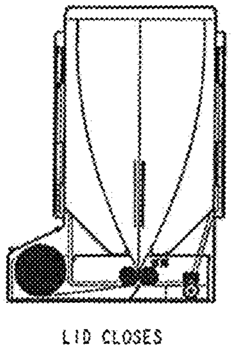
FIG. 14E

TRASH CONTAINER HAVING AUTOMATED REPLACEMENT BAG DISPENSING SYSTEM

CROSS REFERENCE TO RELATED APPLICATIONS

This application is a continuation-in-part of U.S. patent application Ser. No. 17/356,851, filed on Jun. 24, 2021, now U.S. Pat. No. 11,518,609, which claims the benefit of provisional U.S. Patent Application Ser. No. 63/046,084, filed on Jun. 30, 2020.

STATEMENT REGARDING FEDERALLY SPONSORED RESEARCH OR DEVELOPMENT

N/A

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all rights whatsoever.

BACKGROUND OF THE INVENTION

1. Field of the Invention

The present invention relates generally to trash containers, and more particularly to a trash container adapted with an automated replacement bag dispensing system.

2. Description of Related Art

The art described in this section is not intended to constitute an admission that any patent, publication or other information referred to herein is "prior art" with respect to this invention, unless specifically designated as such. In addition, this section should not be construed to mean that a search has been made or that no other pertinent information as defined in 37 C.F.R. § 1.56(a) exists.

Trash cans for storing garbage are essential devices found in virtually every residential and commercial building. A conventional trash can typically includes a lightweight container that receives a disposable liner or bag fabricated from lightweight material such as paper or plastic to facilitate disposal of trash while minimizing soiling of the container. When the trash bag is filled with trash the bag is removed and disposed of. Once removed, a new liner must be installed. The installation of a new liner requires the user to retrieve a fresh liner from its stored location, unfold and open the liner, and place the liner into the trash can while securing the upper edge of the liner in some manner.

In an effort to simplify this process the background art reveals apparatus that incorporate a supply of perforated trash can liners in a holder located at or near the bottom of the trash receptacle. Typically, these bags/liners are connected in end-to-end fashion along transverse perforations. As a leading, filled bag is manually removed from the trash can, a following new bag is drawn into position. The user must then separate the bags along the line of perforation and secure the bag over the top rim of the trash receptacle.

Examples of trash cans incorporating manual bag replacement apparatus are found in several U.S. Patents. U.S. Pat. No. 3,451,453, issued to Heck, discloses a waste receptacle having an internal dispenser for disposable liners located at the bottom of the receptacle. U.S. Pat. No. 4,349,123, issued to Yang, discloses a garbage can with a packaged and folded plastic liner supplier disposed at the bottom of the can. U.S. Pat. No. 4,955,505, issued to Battaglia, discloses a trash receptacle lining system wherein trash bags are deployed from a spindle. Other systems are disclosed in U.S. Pat. No. 5,183,157 (Darden); U.S. Pat. No. 5,503,292 (Cucchia); U.S. Pat. No. 5,505,334 (Triglia); U.S. Pat. No. 5,738,239 (Triglia); U.S. Pat. No. 5,794,809 (Shuval); Meshorer (U.S. Pat. No. 5,881,900); U.S. Pat. No. 7,168,591 (Miller); U.S. Pat. No. 8,807,379 (Hammond); and U.S. Pat. No. 9,701,469 (Reith).

While the references disclosed in the background art are generally suitable for the limited purposes for which they are intended, they remain burdened by significant limitations and disadvantages. In particular, the background art references are limited to manual systems that continue to rely significantly on user-action to install replacement trash bag. Accordingly, there exists a need for further advancement in the art of trash containers. In particular, there exists a need for improvements directed to automating the installation of replacement trash bags.

BRIEF SUMMARY OF THE INVENTION

The present invention overcomes the limitations and disadvantages in the art by providing a trash container having an automated replacement bag dispensing system which automatically deploys a replacement trash bag upon removal of a filled bag. A trash container in accordance with the present invention is adapted with a supply of trash bags which are fed into the main trash container by a motorized roller assembly. A pair of opposing suction pads are pivotally deployed inward and suction activation attracts the opposing sides of the bag to corresponding suction pads. Retraction of the suction pads functions to expand the bag to an open configuration whereby it is suitably configured to receive trash.

Accordingly, it is an object of the present invention to provide advancements in the field of trash containers.

It is another object of the present invention to provide a trash container adapted with an automated system for replacement of trash bags.

These and other objects are met by the present invention which will become more apparent from the accompanying drawing and the following detailed description of the drawings and preferred embodiments.

BRIEF DESCRIPTION OF THE SEVERAL VIEWS OF THE DRAWINGS

FIGS. 14A-14E illustrate the steps involved in loading a replacement bag;

DETAILED DESCRIPTION OF THE INVENTION

The present invention may be understood more readily by reference to the following detailed description taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

In describing this invention, the word "connected" is used. By "connected" is meant that the article or structure referred to is joined, either directly, or indirectly, to another article or structure. By "indirectly joined" is meant that there may be an intervening article or structure imposed between the two articles which are "connected". "Directly joined" means that the two articles or structures are in contact with one another or are essentially continuous with one another. By adjacent to a structure is meant that the location is near the identified structure.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Figure 1:
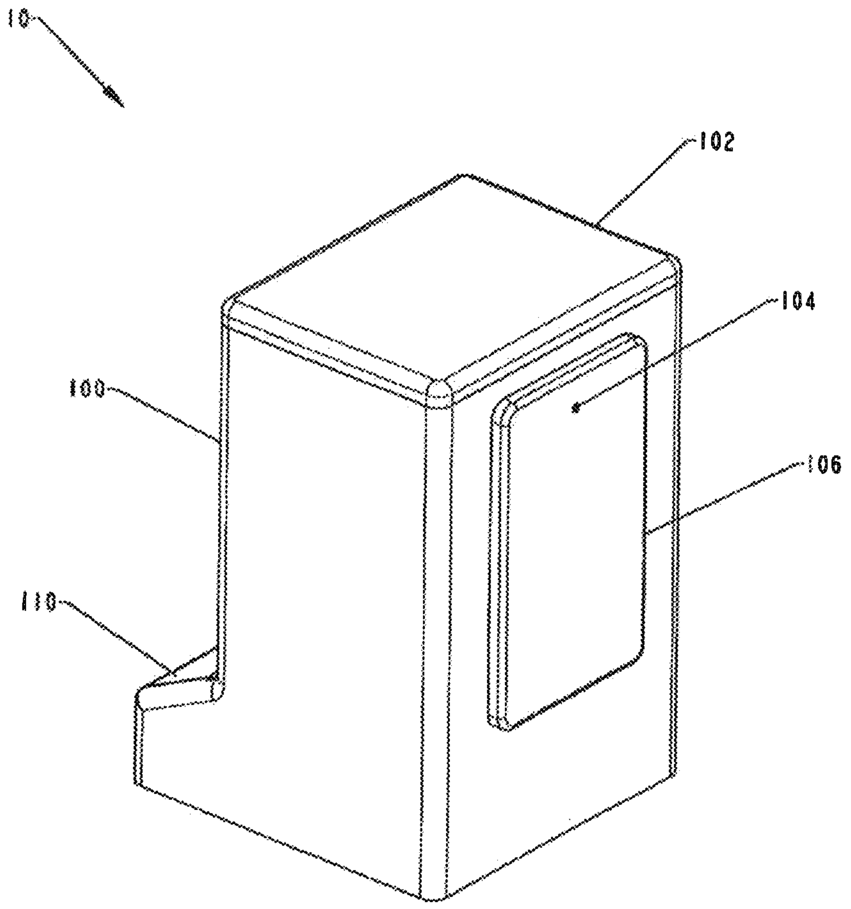
FIG. 1 is a front perspective view of a trash container in accordance with the present invention.
Figure 2:
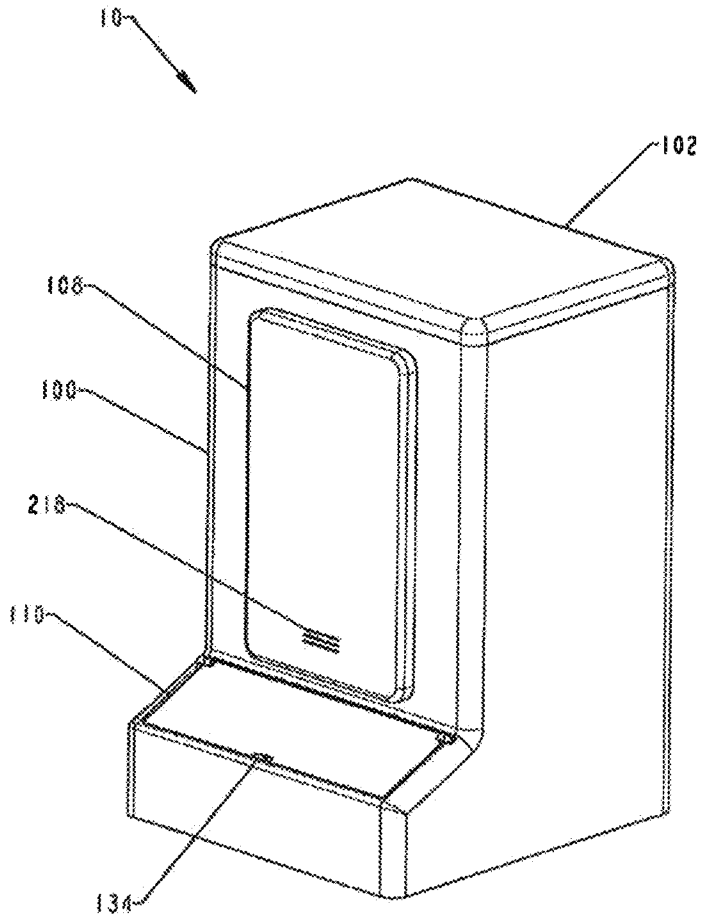
FIG. 2 is a rear perspective view thereof.
Figure 3:
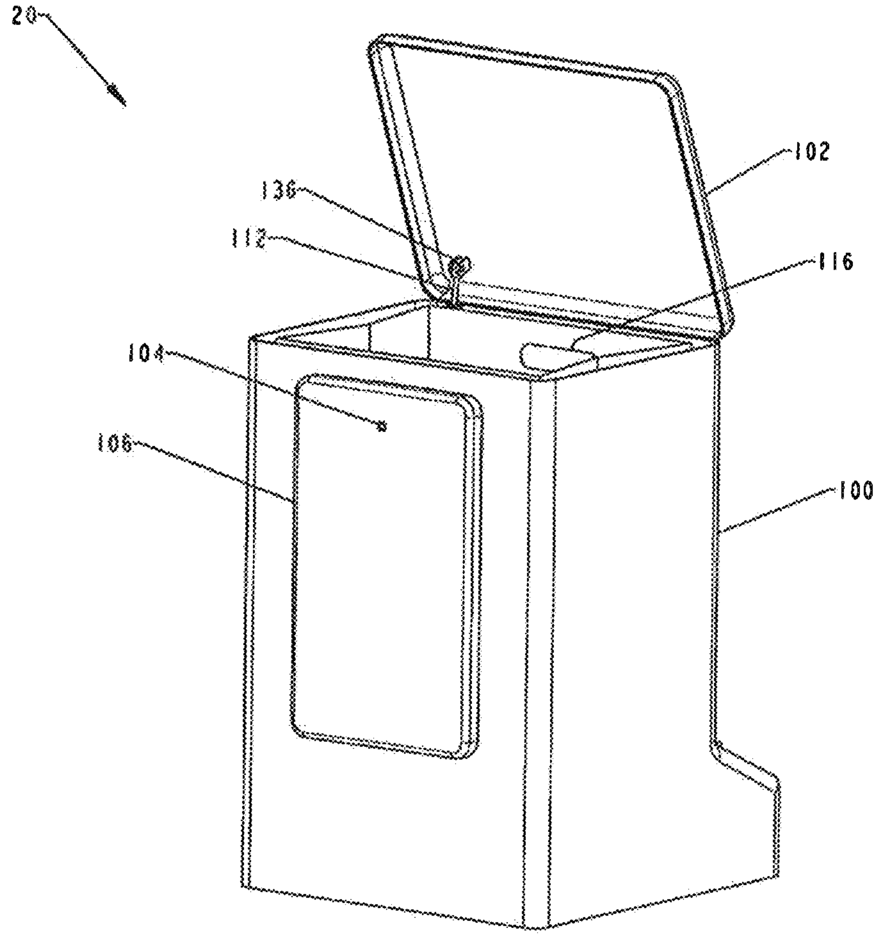
FIG. 3 is a front perspective view with the container main lid in an open configuration.
Figure 4:
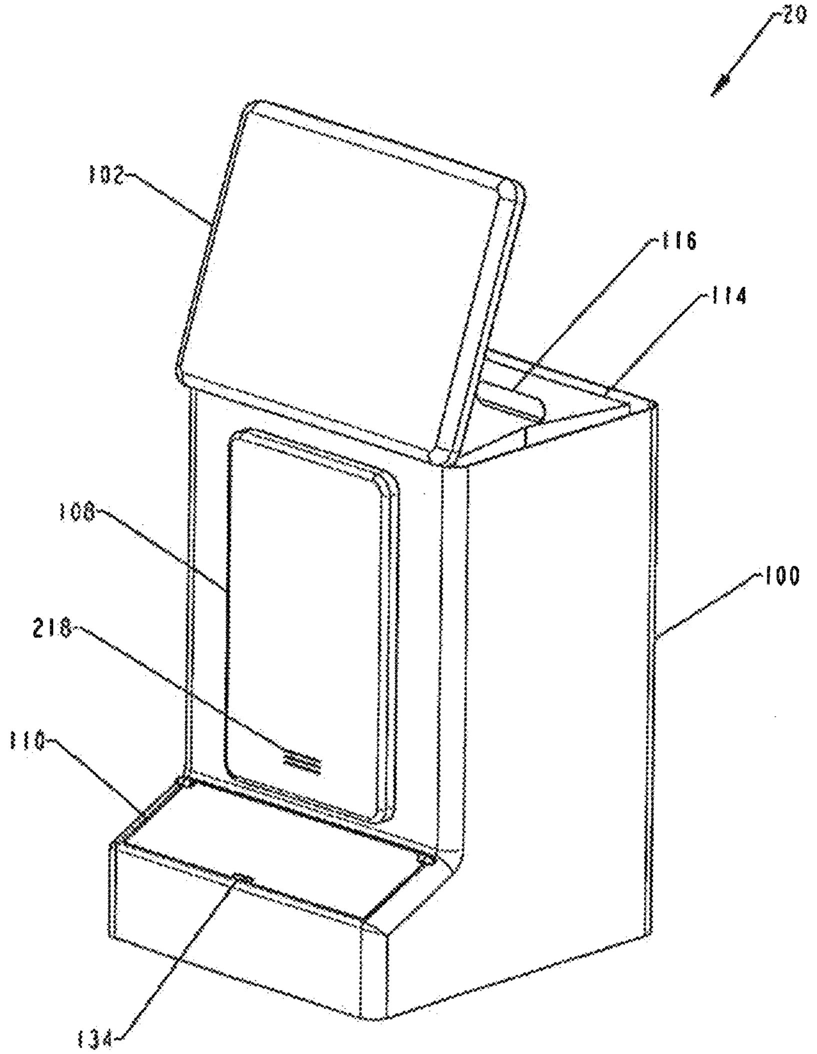
FIG. 4 is a rear perspective view thereof.
Figure 5:
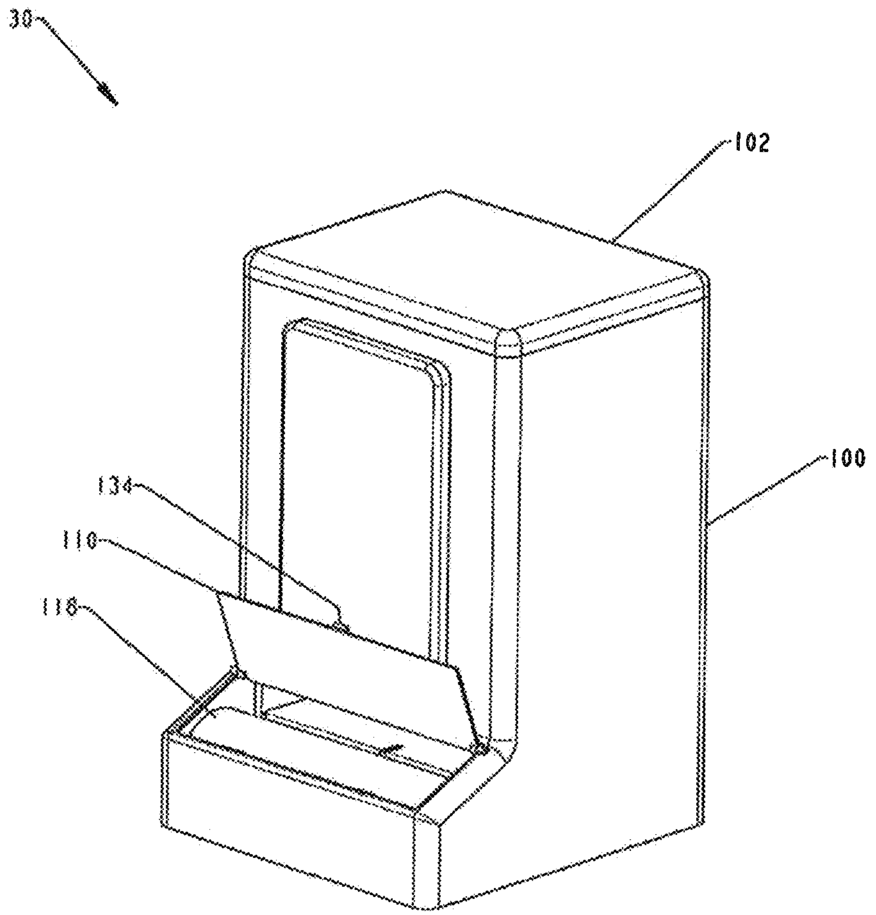
FIG. 5 is a rear perspective view illustrating the access door in an open configuration.

Turning now to the drawings, FIGS. 1-15 depict and illustrate a trash container assembly, generally referenced as 10, having an automated liner dispensing system which automatically deploys a replacement trash bag upon removal of a filled bag. As best seen in FIGS. 1 and 2, trash container assembly 10 includes a main body 100, a main lid 102, a forward facing proximity sensor 104, a front cover 106, and a rear cover 108. Proximity sensor 104 functions to open main lid 102 for a predetermined period of time (e.g. 20 seconds) upon sensing a user moving in proximity to the front of trash container assembly 10 thereby providing the user with a touch free means of depositing trash. A lid lift mechanism may be of any suitable electromechanical configuration as is known in the art of such devices. An access door 110 includes a finger grip 134 and provides access to an internal bag storage department located below access door 110. With reference to FIGS. 3-5, the trash container assembly is depicted with main lid 102 positioned to an open configuration by a lid actuator 112. Also depicted within trash container assembly 10 is a trash bag 114 which includes an opening forming a handle 116. FIG. 5 depicts the access door 110 disposed in an open position wherein a roll of replacement bags 118 is shown within the internal bag storage compartment disposed within main body 100, and preferably offset relative thereto, below access door 110.

Figure 6:
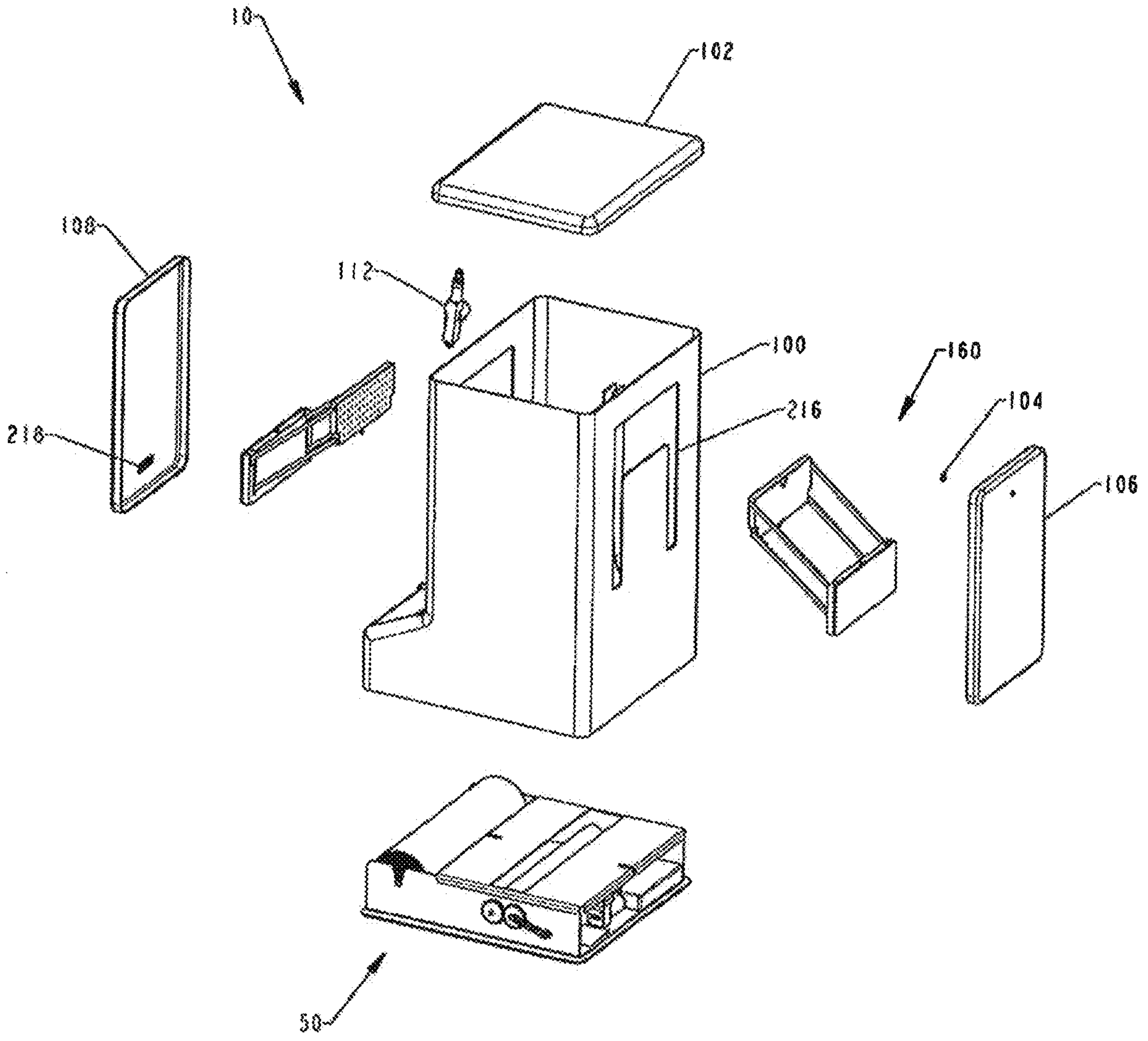
FIG. 6 is an exploded view of the trash container.

FIG. 6 is an exploded view of the trash container assembly, which further depicts the drive assembly 50 separated from the bottom of assembly 10. Also illustrated is a pressure compensation vent 218 formed on rear cover 108, or any other lower portion of main body 100, to allow pressure equalization within the main body 100 of assembly 10. It is important to provide a vent 218 to allow excess air within the main body 100 to vent thereby allowing a newly installed trash bag to completely fill the internal volume defined within main body 100. A clearance cutout 216 is formed in each of the front and rear sides of the main garbage can body 100 to allow for deployment and retraction of vacuum/suction pad assemblies 60 within a recessed volume formed by front and rear covers 106 and 108.

Figure 7:
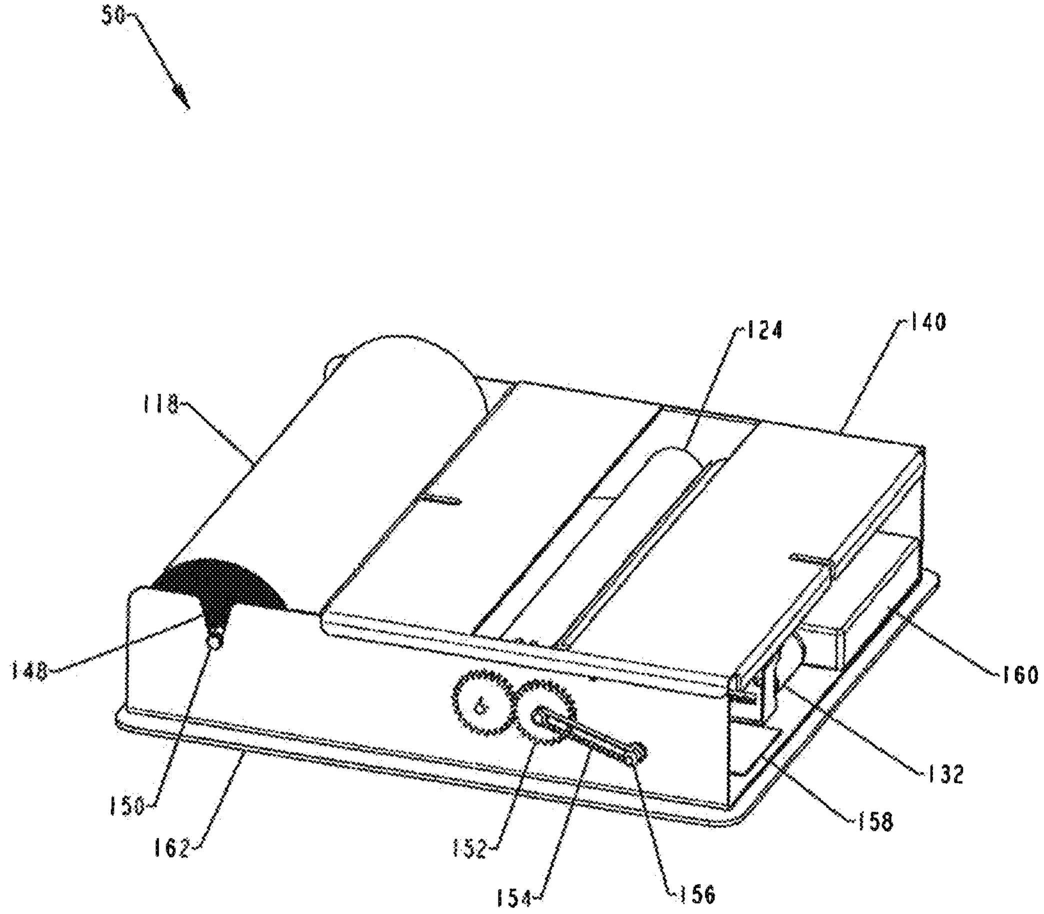
FIG. 7 is a detailed view of the drive assembly.
Figure 8:
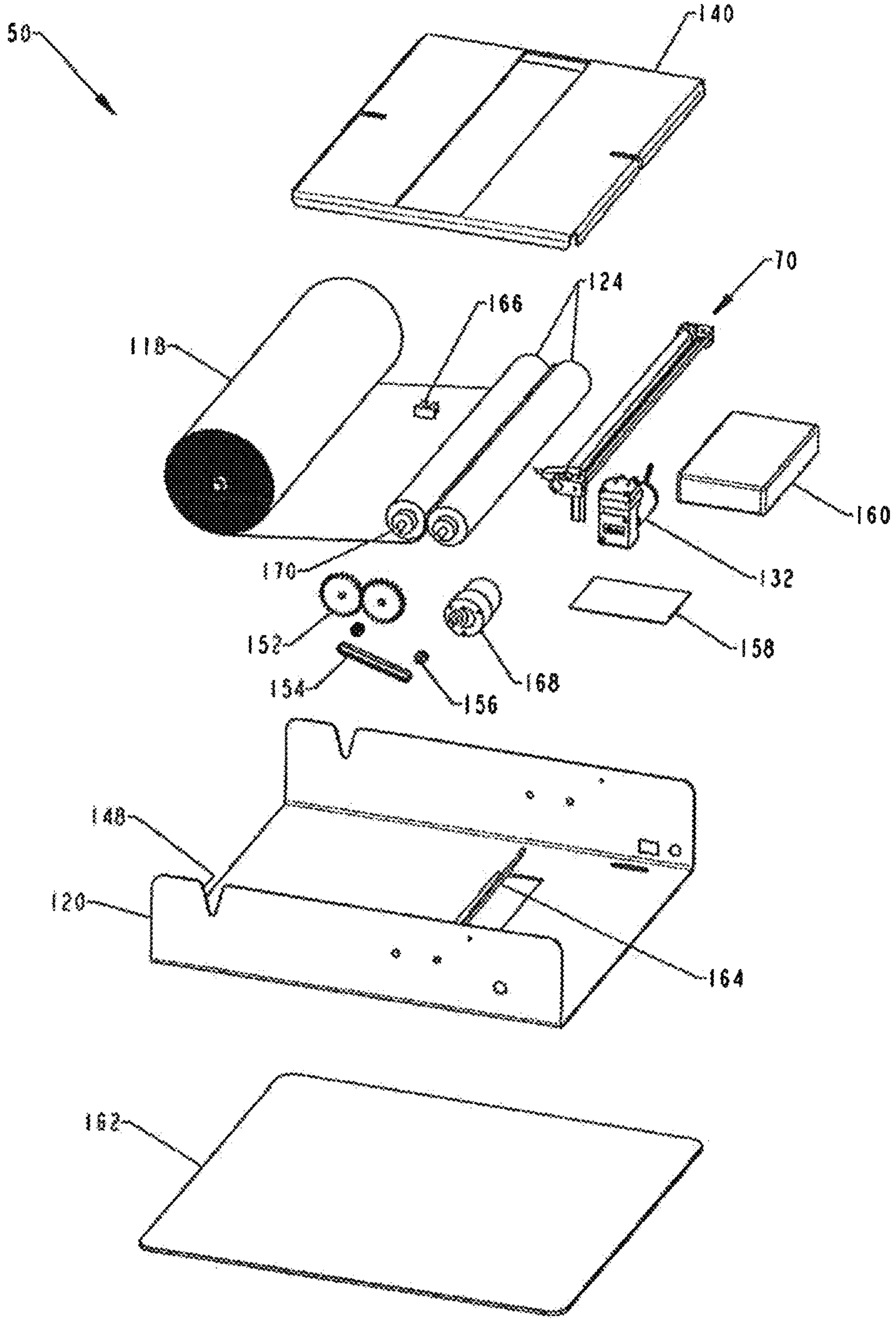
FIG. 8 is an exploded view thereof.

FIGS. 7 and 8 provide detailed views of drive assembly 50 which rests on a bottom cover 162. Drive assembly 50 incudes a frame 120 having a frame cover 140. A roll of bags 118 is rotatably disposed on a bag roll shaft 150 which rides in a V-shaped groove 148. A drive roller mechanism 124 is powered by a drive mechanism including a roller drive motor 168 having an output shaft connected to a toothed pully 156 upon which a drive belt 154 turns. Drive belt 154 is further configured for powered rotation of a roller gear 152 which drives roller mechanism 124 about roller shaft 170 whereby the roll of bags 118 is pulled through. Frame 120 includes an upwardly inclined bag deflector 164, which deflects bag material upward to roller mechanism 124. A bag cutter assembly 70 functions to selectively cut the bags as more fully discussed below. The drive assembly further houses a battery 160, a controller 158, a vacuum pump 132, and a bag present/empty "slit" sensor 166. Drive assembly may further include a sensor to detect when the bag dispensing system has run out of bags, and a wireless communication module configured to wirelessly transmit an "out of bags" notification. The wireless communication module is preferably WiFi enabled such that the notifications and other communications may be achieved using the Internet. In a first embodiment, the communication module may transmit a text or e-mail notification to the user that the system has run out of bags. In a second embodiment, the communication module may transmit an order over the Internet to an on-line store such as AMAZON.COM®. AMAZON® is a registered trademark of Amazon.com, Inc. (Seattle, WA). Other notifications or communications may be generated, such as trash is "full," "lid is open," etc.

Figure 9:
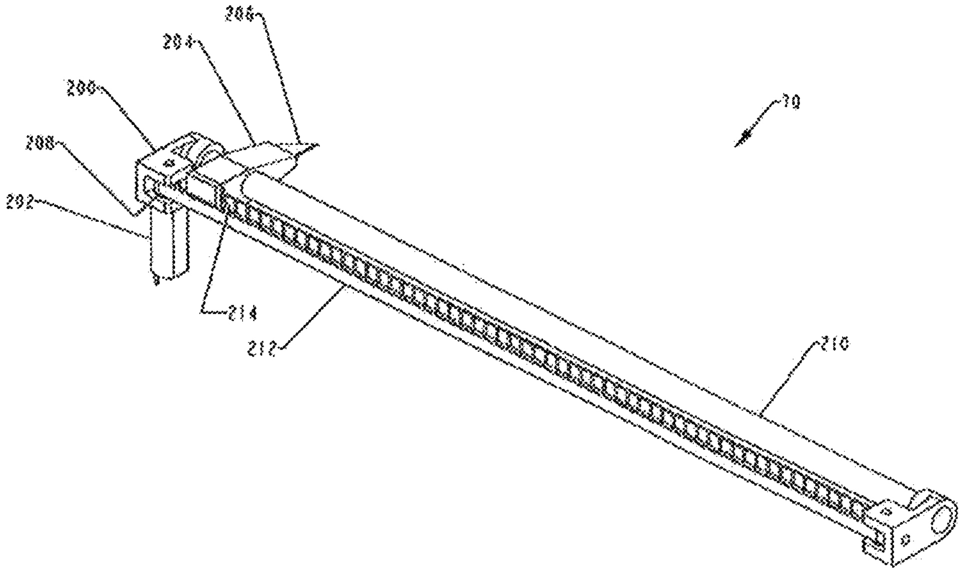
FIG. 9 is a perspective view of the bag cutter assembly.
Figure 10:
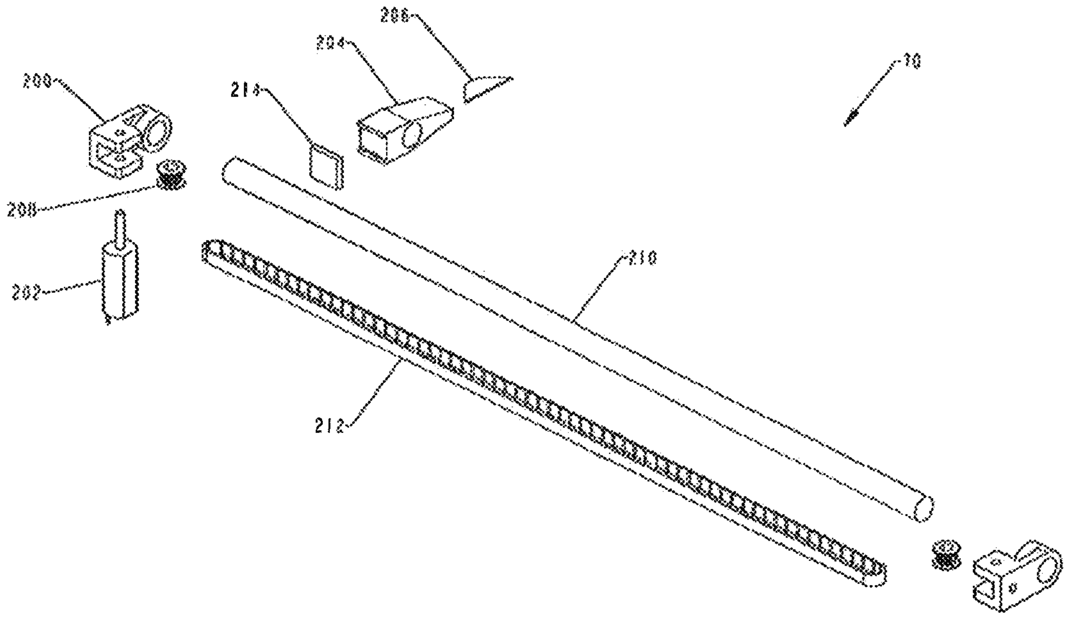
FIG. 10 is an exploded view thereof.

FIGS. 9 and 10 depict the bag cutter assembly 70 which includes a blade mechanism mount bracket 200, a blade mechanism drive motor 202, a blade holder 204, and a blade 206. A toothed pulley 208 drives a toothed belt 212 which is connected to blade holder 204 such that the blade holder travels along a guide rod 210 whereby blade 206 is caused to slice a bag. Toothed belt 212 is secured to blade holder 204 by a belt clamp 214 as best seen in FIG. 10. Blade 206 is preferably removably affixed to blade holder 204 to allow for replacement of dull blades with fresh sharp blades.

Figure 11:
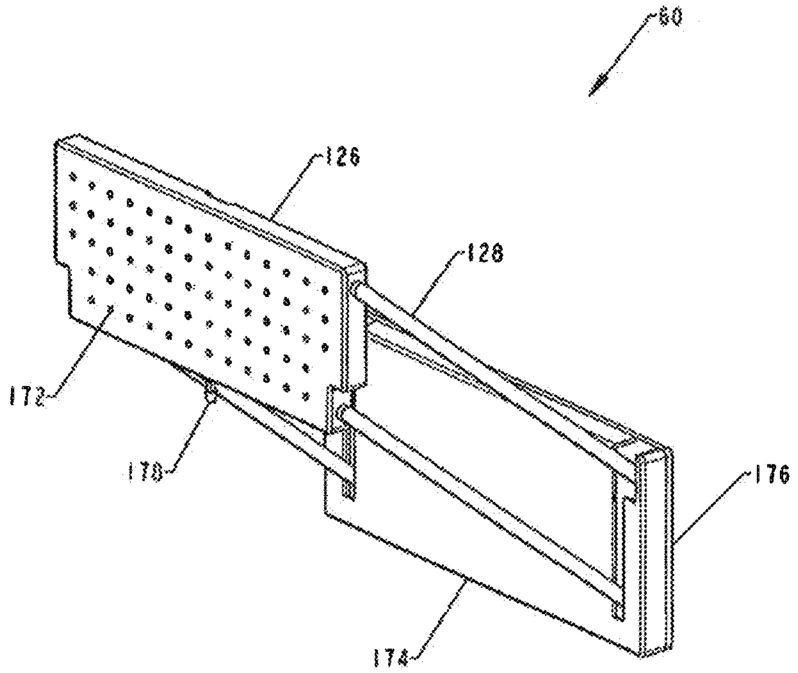
FIG. 11 is a perspective view of the suction pad assembly.
Figure 12:
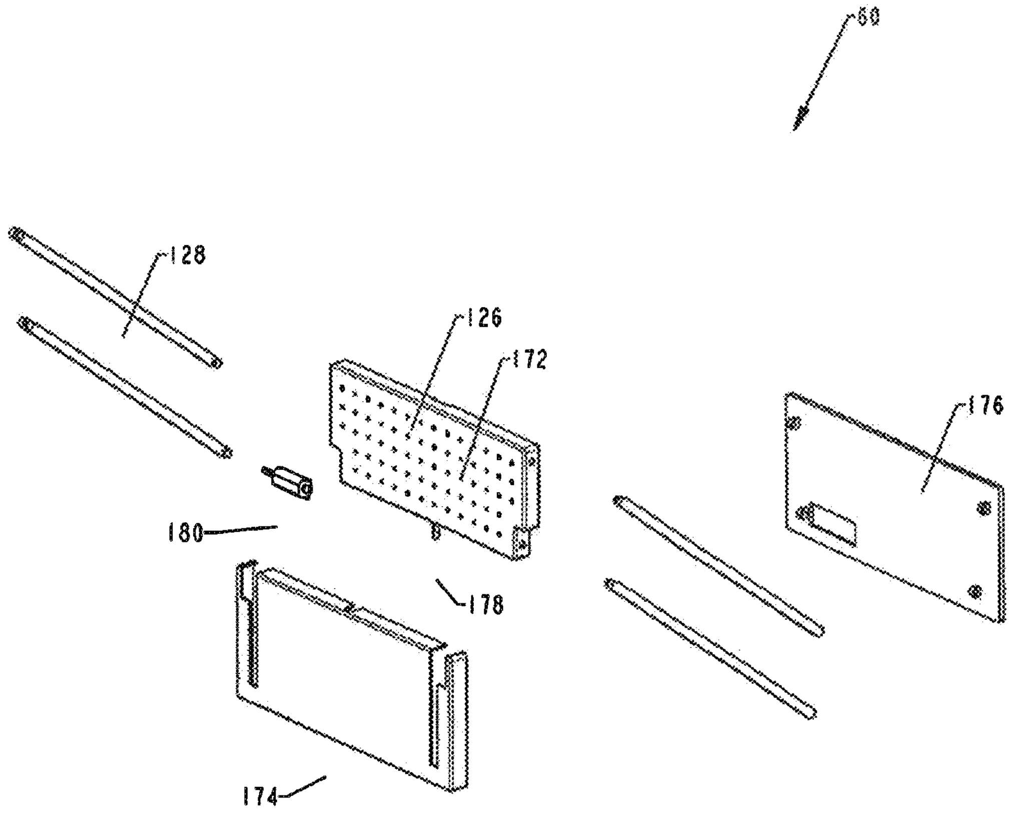
FIG. 12 is an exploded view thereof.
Figure 13:
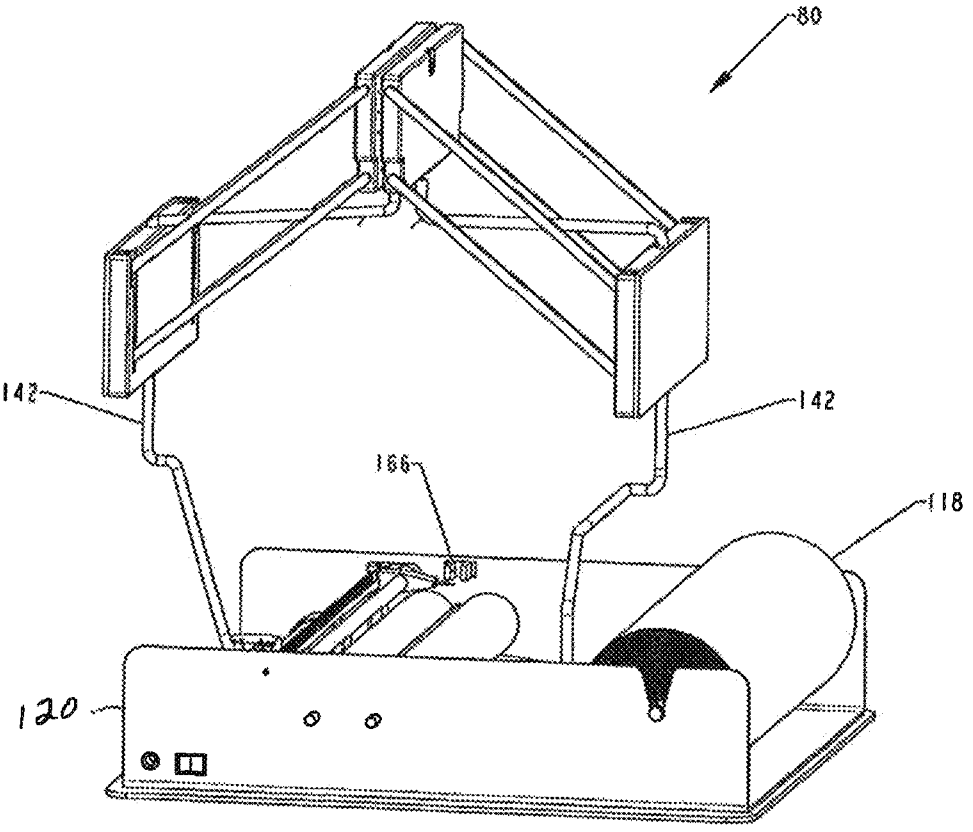
FIG. 13 illustrates the drive assembly and the suction pad assembly.

FIG. 11 depicts one of the two opposing suction pad assemblies 60 which is pivotally configurable between a retracted configuration and a deployed configuration (as seen in FIG. 11). A pair of opposing suction pad assemblies 60 are deployed to engage opposing sides of a bag and then retracted to spread the bag to an open configuration. A suction force maintains the bag in engagement with the suction pad. Each suction pad assembly 60 includes a vacuum pad 126 which defines a plurality of vacuum holes 172 thereon. Vacuum pad 126 is pivotally connected to a vacuum pad base 176 by a plurality of links 128, preferably configured as parallelogram type link as seen in FIG. 11. A base cover 174 is affixed to base 176. A barbed vacuum tube connector 178 is disposed on vacuum pad 126 for receiving a vacuum tube. Each suction pad assembly includes a drive motor 180 which functions to move the vacuum pad between the retracted and deployed positions. FIG. 13 illustrates a final assembly, generally referenced as 80, with the vacuum pads in a deployed configuration. A roll of bags 118 is disposed in the frame 120. Vacuum tubes 142 are in fluid communication with vacuum pump 132 (not seen in FIG. 13) and further in fluid communication with vacuum pads 126 whereby suction force may be generated.

Figure 15:
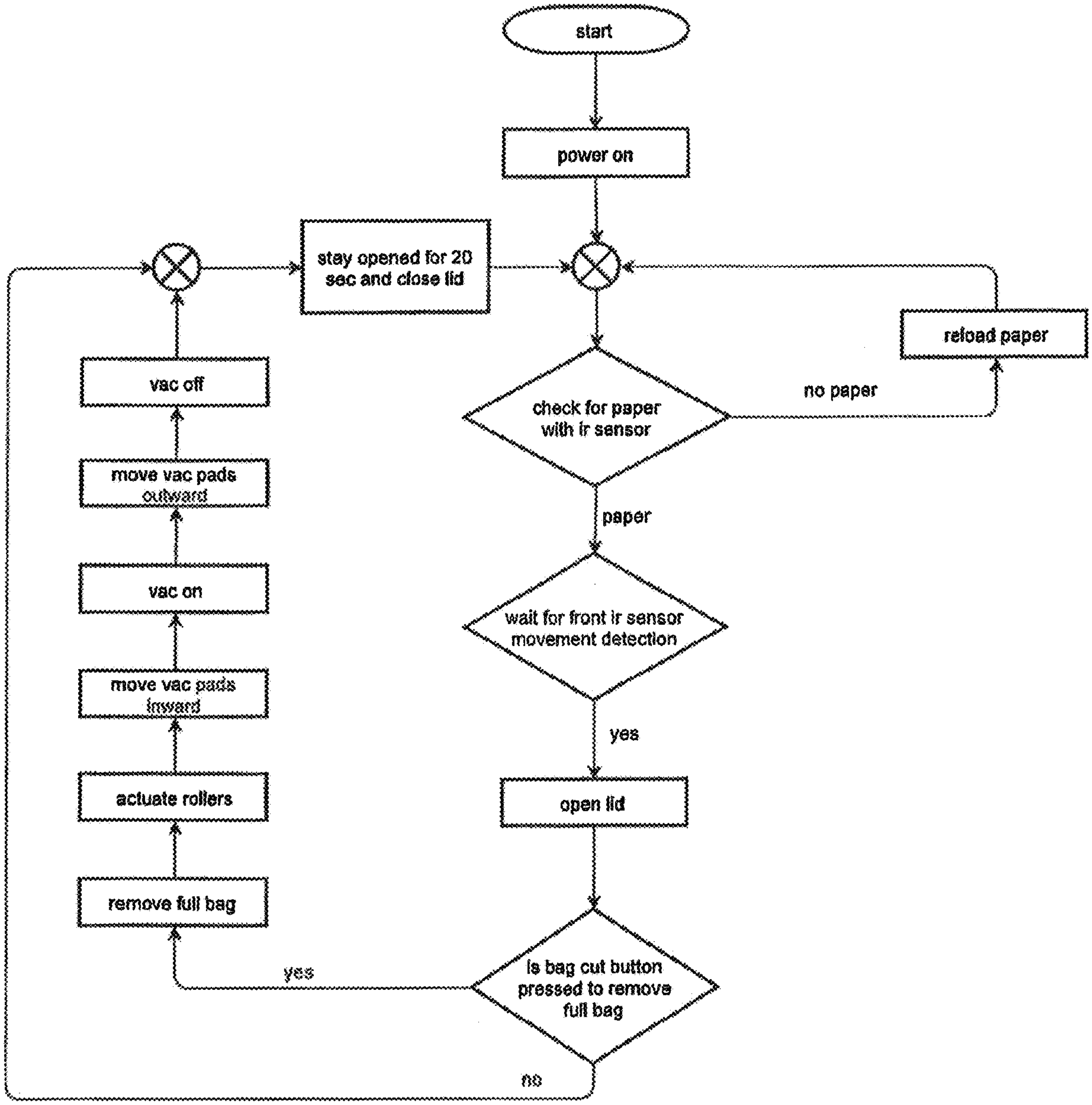
FIG. 15 is a flow chart illustration of the automated bag loading process.

Turning now to FIGS. 14A-14E, the steps involved in loading a replacement bag are schematically illustrated. FIG. 14A illustrates the commencement of the process wherein a first bag is entering the drive rollers 124. When the lid opens, the bag is pulled up vertically through the drive rollers 124 and guided by vertically disposed trash bag guide ribs 138 affixed on opposing inner side walls within main body 100 which define a trash bag guide channel therebetween and function to keep the bag generally centered in its flattened state 144 as seen in FIG. 14B. FIG. 14C illustrates deployment of vacuum pads 126 to a deployed position in adjacent relation with the flattened bag 144. As seen in FIG. 14D, the application of a suction force combined with retraction of vacuum pads 126 function to configure the bag to its expanded state wherein the bag is suitably configured to accept trash. FIG. 15 is a flow chart illustration of the process.

The present invention further contemplates adapting suction pad assembly 60 to close and seal the top of the bag when it is full. In accordance with this aspect of the present invention the pair of opposing suction pad assemblies are again deployed to force opposing sides of the bag to a closed configuration. One of the suction pad assemblies includes a mechanism (not shown) that folds the bag to a closed configuration. In yet another contemplated configuration a sealing mechanism (not shown) that is applied to the bag to maintain it in the closed configuration. Suitable sealing structures may include application of an adhesive or mechanical clip or clamp to maintain the bag in the closed configuration. In a first contemplated activation embodiment a push button or other input user actuated device is provided to allow for user activation of the closing and sealing process. In a second contemplated activation embodiment the trash container is further adapted with one or more additional sensors, such as a weight sensor and/or a bag fill level sensor, that automatically activate the bag closing and sealing process when the bag has reached a predetermined weight and/or a predetermined level of trash has accumulated within the bag.

Figure 16:
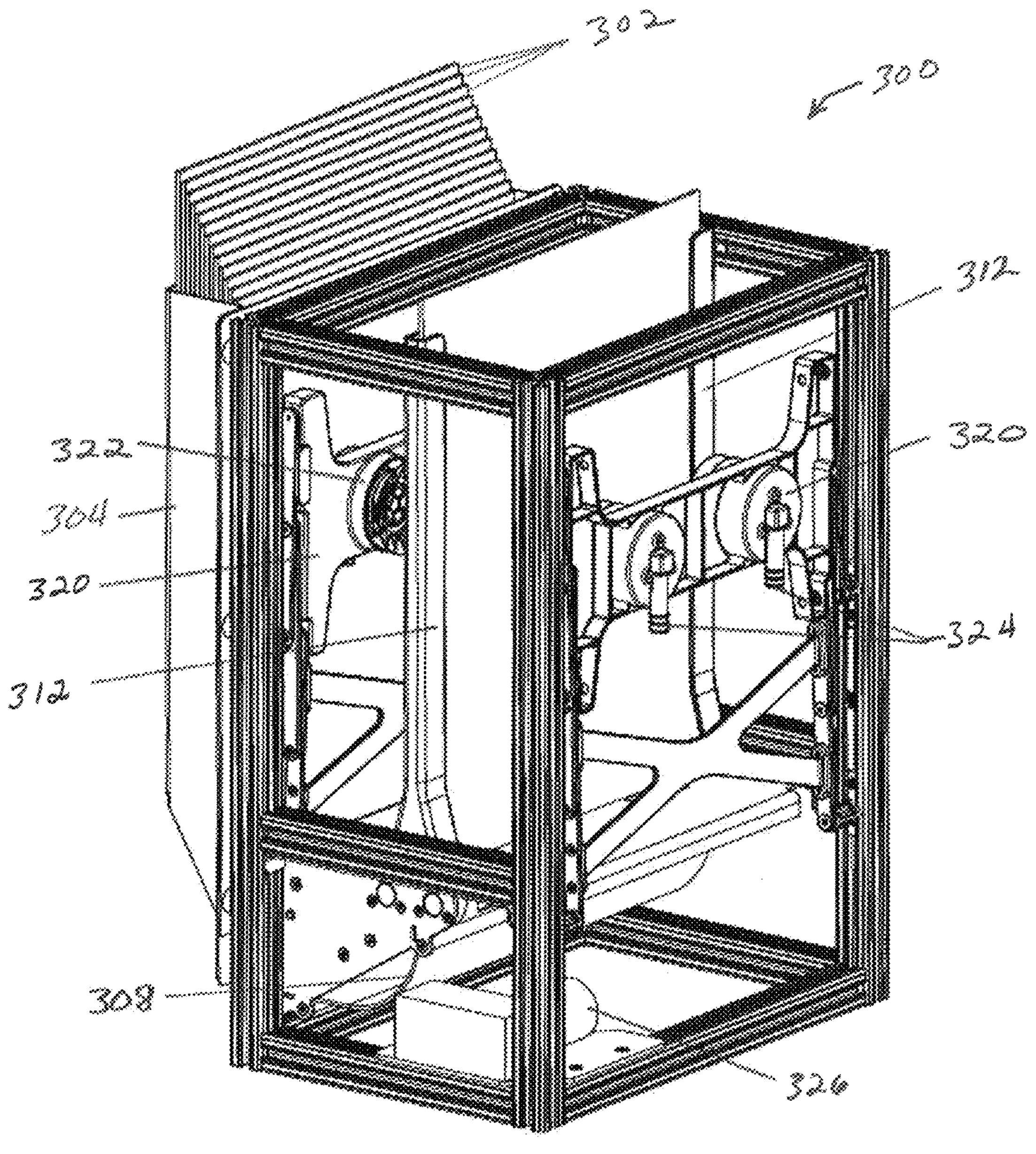
FIG. 16 is a front perspective view of an alternate embodiment trash container in accordance with the present invention with outer panels removed to illustrated mechanics adapted for use with paper bags.
Figure 17:
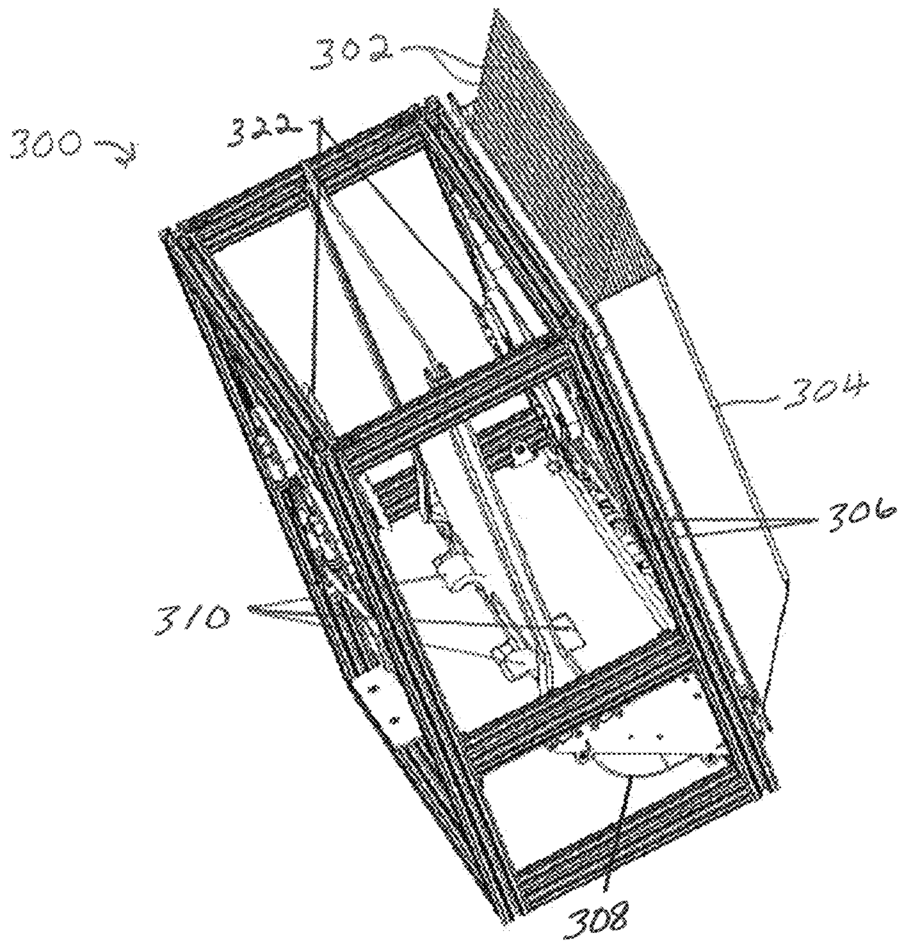
FIG. 17 is a top perspective view thereof.
Figure 18A:
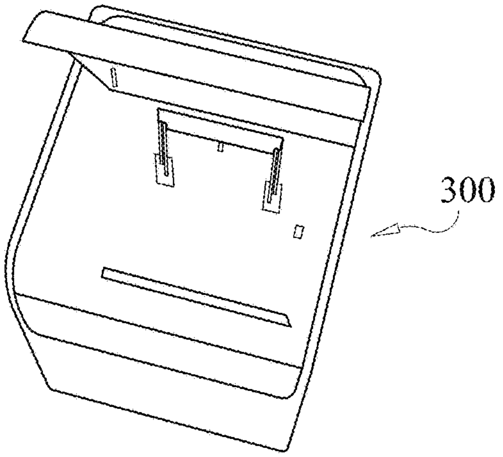
FIG. 18 depicts a series of illustrations (referenced as 18A-E) depicting the replacement of a paper bag into the trash container.
Figure 18B:
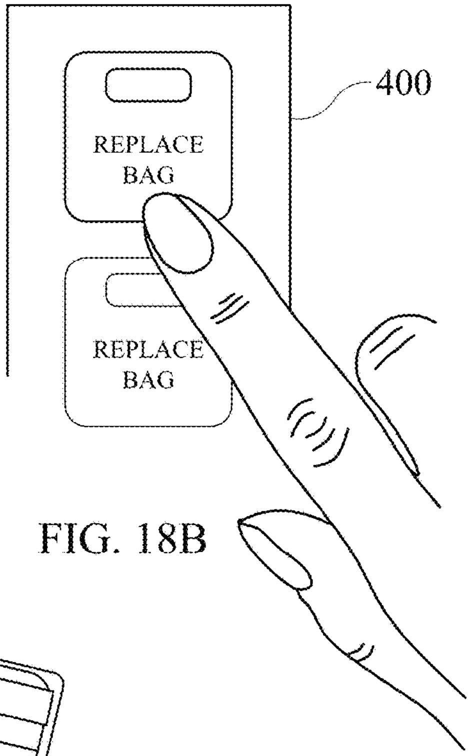
Figure 18C:
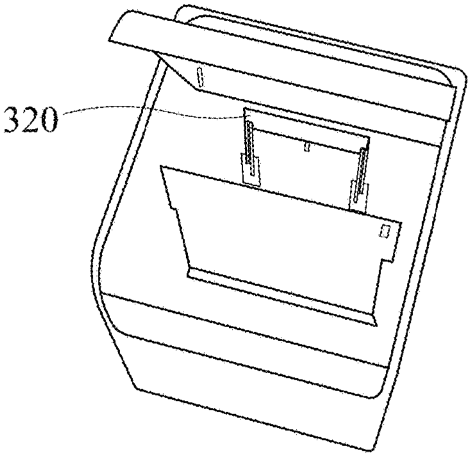
Figure 18D:
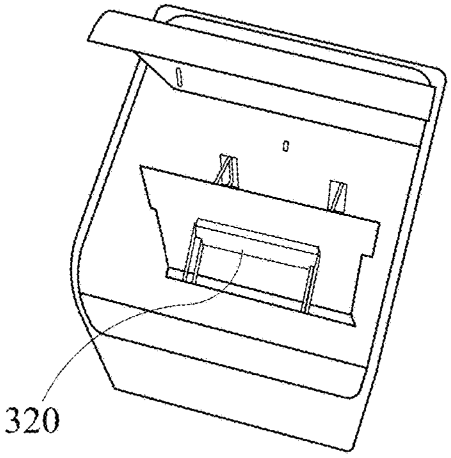
Figure 18E:
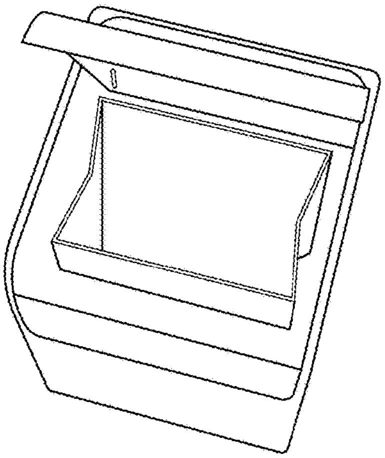

FIG. 16 is a partial front perspective view of an alternate embodiment automated trash container, generally referenced as 300, in accordance with the present invention adapted for use with paper bags. FIG. 17 is a top perspective view thereof. Automated trash container 300 is particularly adapted for use with prefabricated paper bags 302. A bag cassette 304 is connected to the rear of automated trash container 300 and functions to receive a supply of paper bags 302 therein. Replacement bags are drawn from bag cassette 304 by a plurality of first rollers 306 and guided by a curved guide plate 308 which guides the bag upward in U-turn fashion. A second set of rollers 310, with roller members disposed on both in front and behind the bag, transports the bag upward between lateral bag guides 312 to its final position for use. Lateral bag guides 312 project inwardly from each opposing sidewall within said main container body and form a guide channel to guide said trash bags upward in a flattened configuration.

In a manner similar to the first disclosed embodiment, two opposing suction assemblies, referenced as 320, are pivotally configurable between a retracted configuration (as shown in FIG. 16) and a deployed configuration. Each suction assembly 320 is deployed to engage opposing sides of a bag and then retracted to spread the bag to an open configuration. Each suction assembly includes a pair of suction cups 322 which use suction force to maintain the bag in engagement therewith. Each suction cup 322 incudes a barbed vacuum tube connector 324 for receiving a vacuum tube. As used herein the term "suction cup" shall broadly be construed to encompass any suitable structure for engaging and manipulating a bag using suction/vacuum force. Each suction pad assembly includes a drive motor 326 which functions to move the vacuum pad between the retracted and deployed positions.

FIG. 18 depicts a series of illustrations, referenced as 18A-18E, depicting the replacement of a paper bag into the trash container 300. FIG. 18A illustrates the automated trash container without a bag therein. FIG. 18B illustrates initiation of the bag replacement cycle by pressing the "Replace Bag" button. FIG. 18C illustrates a replacement bag moved into position by the rollers and lateral bag guides as disclosed above. FIG. 18D illustrates deployment of the opposing suction assemblies 320 into engagement with the bag whereby the application of suction causes suction assemblies to become connected to the bag. FIG. 18E illustrates opening of the mouth of the bag by retraction of the suction assemblies.

Figure 19A:
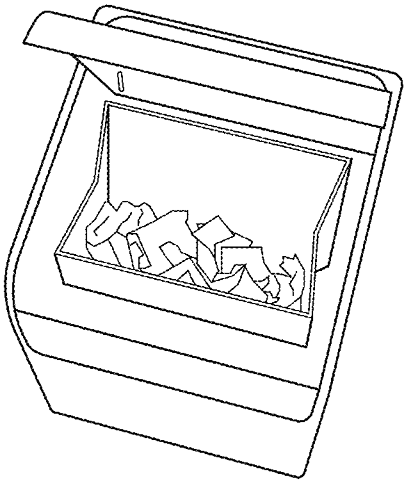
FIG. 19 depicts a series of illustrations depicting the sealing and removal of a full paper bag.
Figure 19B:
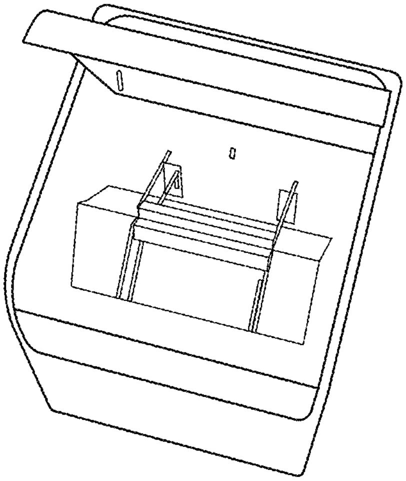
Figure 19C:
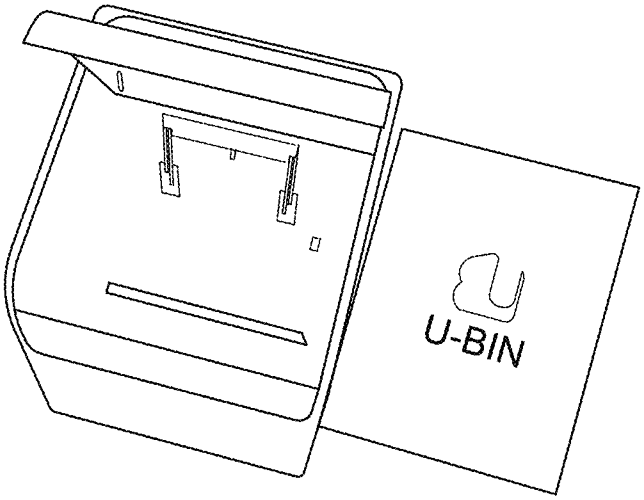

FIG. 19 depicts a series of illustrations, referenced as 19A, 19B, and 19C, depicting the sealing and removal of a full paper bag. FIG. 19A illustrated a full bag in the automated trash container with the lid open. FIG. 19B depicts the suction assemblies 320 to the deployed configuration wherein the top of the bag is forced to a closed position. It should be noted that the top of the bag may further be folded, crimped, or otherwise configured shut at this stage. Finally, FIG. 19C depicts the closed and full trash bag removed from the automated trash container.

Figure 20:
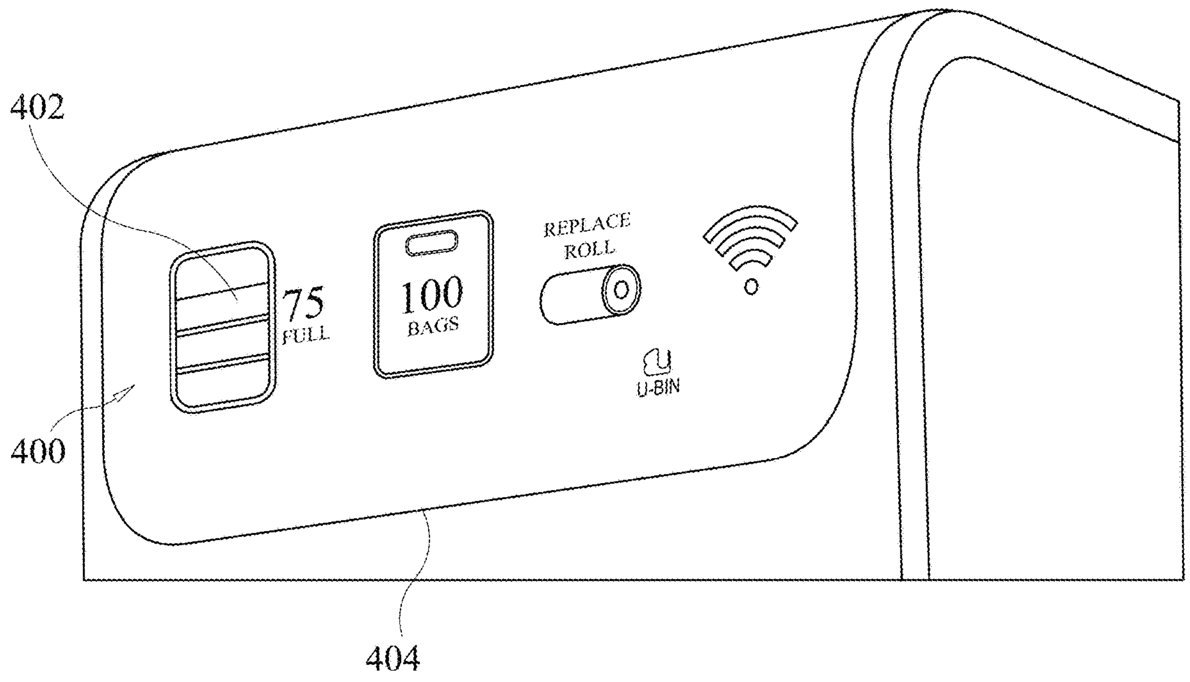
FIG. 20 is a partial front perspective view of a touch screen control panel for a trash container in accordance with the present invention.

FIG. 20 is a partial front perspective view of a touch screen control panel, generally referenced as 400, for a trash container in accordance with the present invention. Touch screen control panel includes am electronic display and graphic user interface that allows for the presentation of information regarding automated trash container 300. Among the information displayed in a graphical depiction of how full the bag is presented in terms of percent "full" with a corresponding bar graph, generally referenced as 402. In addition, the number of available replacement bags is displayed in an additional cell, referenced as 404. A WiFi connection symbol 406 confirms that the automated trash container is connected to the Internet to enable functions set forth hereinabove.

The instant invention has been shown and described herein in what is considered to be the most practical and preferred embodiment. It is recognized, however, that departures may be made therefrom within the scope of the invention and that obvious modifications will occur to a person skilled in the art.

What we claim is:

1. An automated trash container comprising:

a main container body;

a trash bag cassette connected to said main container body to receive a supply of trash bags therein, said trash bag cassette having a top opening to receive trash bags and a bottom opening to dispense trash bags therefrom;

a supply of trash bags removably received within said trash bag cassette;

a first set of rollers disposed in proximity to the bottom opening of said trash bag cassette and configured to draw a trash bag from said trash bag cassette;

a curved guide plate configured to direct said trash bag upward;

a pair of lateral bag guides configured to receive said trash bag from said guide plate and guide said trash bag upward through said main container body;

a second set of rollers including roller members disposed on both in front and behind said pair of lateral bag guides to transport the bag upward to a use position;

a pair of suction assemblies disposed on opposing front and rear interior sides of said main container body;

each suction assembly including at least one suction cup;

said pair of suction assemblies configurable between a retracted position wherein each of said pair of suction assemblies is disposed generally adjacent to opposing interior sides of said main container body, and a deployed position wherein each of said pair of suction assemblies is disposed generally in the center of said main container body;

a drive motor configured to actuate said suction assemblies between said retracted and deployed positions; and a vacuum pump in fluid communication with each of said suction cups;

said suction cups engaging opposing sides of said trash bag when advanced from said trash bag cassette into said use position by said first and second sets of rollers and said pair of lateral bag guides in the flattened configuration and configuring said trash bag to an expanded configuration upon application of suction to said suction cups and retraction of said vacuum assemblies.

2. The automated trash container of claim 1 further including a touch screen control panel including an electronic display and graphic user interface that allows for the presentation of information regarding automated trash container and control thereof.

3. The automated trash container of claim 2 further including a wireless communication module adapted to enable Internet communication.

4. The automated trash container of claim 1 further including a pressure compensation vent that allows excess air within the main container body to vent upon installation of a new trash bag thereby allowing pressure equalization whereby a newly installed trash bag fills the internal volume defined within said main container body.

* * * * *